United States Patent Office 3,062,880
Patented Nov. 6, 1962

3,062,880
HETEROCYCLIC ORGANOBORON COMPOUNDS
James L. Boone, Fullerton, Calif., assignor to United States Borax & Chemical Corporation, Los Angeles, Calif., a corporation of Nevada
No Drawing. Filed Feb. 5, 1962, Ser. No. 171,257
7 Claims. (Cl. 260—551)

The present invention relates as indicated to new heterocyclic organoboron compounds and has more particular reference to ketotriazadiborinanes and means for preparing the same.

It is, therefore, the principal object of the present invention to provide as new compositions, the ketotriazadiborinanes.

It is a further object of this invention to provide means for preparing the ketotriazadiborinanes.

Other objects of the present invention will apepar as the description proceeds.

To the accomplishment of the foregoing and related ends, said invention then comprises the features hereinafter fully described and particularly pointed out in the claims, the following description setting forth in detail certain illustrative embodiments of the invention, these being indicative, however, of but a few of the various ways in which the principle of the invention may be employed.

Broadly stated, the present invention comprises the ketotriazadiborinanes having the formula

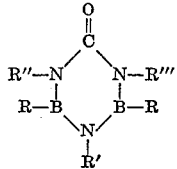

where R is a radical selected from the group consisting of alkyls of from 1 to 5 carbon atoms, phenyl, m-substituted phenyl and p-substituted phenyl, said substituents selected from the group consisting of methyl, methoxy and chloro radicals, R' is a radical selected from the group consisting of hydrogen, alkyls of from 1 to 5 carbon atoms, phenyl, m-substituted phenyl and p-substituted phenyl, said substituents selected from the group consisting of methyl, methoxy and chloro radicals and R" and R'" are radicals selected from the group consisting of alkyls of from 1 to 5 carbon atoms and hydrogen.

The present ketotriazadiborinanes have numerous applications in organic synthesis and polymer formation. These compounds have use as epoxy resin curing agents, and when added to various polymerization reaction mixtures they increase the degree of thermal stability of the finished polymeric material. Further, the present compounds have been found to be effective bacteriostatic agents, fungicides and herbicides. They have also been found to have a synergistic effect when included in many of the known herbicidal compositions.

The preparation of the ketotriazadiborinanes of the present invention can best be illustrated by the following equation:

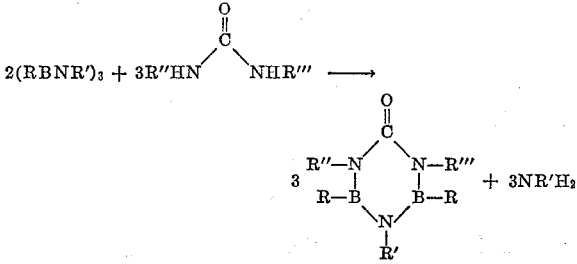

where R is a radical selected from the group consisting of alkyls of from 1 to 5 carbon atoms, phenyl, m-substituted phenyl and p-substituted phenyl, said substituents selected from the group consisting of methyl, methoxy and chloro radicals, R' is a radical selected from the group consisting of hydrogen, alkyls of from 1 to 5 carbon atoms, phenyl, m-substituted phenyl and p-substituted phenyl, said substituents selected from the group consisting of methyl, methoxy and chloro radicals and R" and R'" are radicals selected from the group consisting of alkyls of from 1 to 5 carbon atoms and hydrogen. Thus, the present ketotriazadiborinanes are prepared by reacting a B-triorganoborazole with urea or a monosubstituted or an N,N'-disubstituted urea.

The present compounds can be prepared with or without the presence of a heat transfer medium. Any of the common hydrocarbon solvents such as benzene, toluene, chlorobenzene, etc., can be used as the heat transfer medium. The reaction mass is heated under reflux in an inert atmosphere, the most volatile reaction product is removed by distillation, and the desired product is recovered from the residual reaction mass by any of the well-known separation techniques such as crystallization, distillation, sublimation, etc.

The present reaction will proceed regardless of the amount of each reactant present; however, I have found that the product is most easily separated from the residual reaction mass and the yield of product is greatest when stoichiometric amounts of the reactants are present. Therefore, in the preferred embodiment of the invention, when preparing the ketotriazadiborinanes, I use the B-triorganoborazole and the urea compound in about a 2:3 molar ratio, respectively.

The following list is illustrative of the B-triorganoborazoles applicable to the present invention:

B-trimethylborazole
B-trimethyl-N-triphenylborazole
B-triethylborazole
B-triisopropylborazole
B-triethyl-N-triisoamylborazole
B-tri-sec-butylborazole
B-tri-n-propyl-N-triethylborazole
B-tri-n-amylborazole
B-trimethyl-N-tri-sec-butylborazole
B-triphenylborazole
B-triphenyl-N-triethylborazole
Hexaphenylborazole
Hexamethylborazole
B-tri-p-tolyl-N-trimethylborazole
B-triphenyl-N-trimethylborazole
B-tri-n-butyl-N-triethylborazole The second group of reactants applicable to the present invention consists of urea, and monosubstituted or N,N'-disubstituted urea. These compounds have the general formula

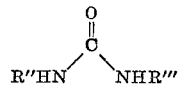

where R" and R'" are alkyl radicals of from 1 to 5 carbon atoms, or hydrogen, and they can both be the same or different.

The follcwing list is illustrative of the applicable urea compounds:

Urea
Methylurea
Ethylurea
Isopropylurea
t-Butylurea
Isoamylurea
N,N'-dimethylurea
N,N'-diethylurea N,N'-diisobutylurea
N-methyl-N'-n-butylurea
N-ethyl-N'-isoamylurea
N-ethyl-N'-isobutylurea It is to be clearly understood that the foregoing lists of compounds are only a partial enumeration of the reactants applicable to the present invention, and are not intended to limit the invention.

So that the present invention can be more clearly understood, the following examples are given for illustrative purposes:

*I*

B-trimethylborazole, 6.0 grams (0.0489 mole) and 6.46 grams (0.0733 mole) of N,N'-dimethylurea were added to a 100 ml. round-bottomed flask. The reaction mixture was then heated under reflux for about 24 hours during which time a slow sweep of dry nitrogen carried out the theoretical amount, 1.25 grams, of ammonia. The residual reaction mass was then heated at reduced pressure and 7.25 grams (64.7% yield) of 1,2,4,5-tetramethyl-6-keto-1,3,5,2,4-triazadiborinane was recovered as the sublimate. Chemical analysis of the product yielded the following data:

| Calculated for $C_5H_{13}B_2N_3O$ | Found in product |
|---|---|
| B=14.16%. | B=13.87%. |
| C=39.29%. | C=37.05%. |
| H=8.57%. | H=8.70%. |
| N=27.50%. | N=26.95%. |
| Mol. Wt.=152.8. | Mol. Wt.=148.4. |

*II*

B-trimethyl-N-triphenylborazole, 14.04 grams (0.040 mole) and 3.60 grams (0.060 mole) of urea were added to a 500 ml. round-bottomed flask in a nitrogen atmosphere. The reaction mixture was then heated under reflux at reduced pressure for about 24 hours and the resultant reaction mass was distilled to yield 4.97 grams of aniline (90% of theoretical) and a residual solid material. The solid reaction product was then heated at reduced pressure and 7.99 grams (66.3% yield) of 3-phenyl-2,4-dimethyl-6-keto-1,3,5,2,4-triazadiborinane was recovered as the sublimate. Chemical analysis of the product yielded the folowing data:

| Calculated for $C_9H_{13}B_2N_3O$ | Found in product |
|---|---|
| B=10.77%. | B=10.64%. |
| C=53.82%. | C=51.89%. |
| H=6.52%. | H=6.63%. |
| N=20.92%. | N=20.78%. |
| Mol. Wt.=200.9. | Mol. Wt.=197.3. |

*III*

B-triphenyl-N-triethylborazole, 10.23 grams (0.0261 mole) and 3.45 grams (0.0392 mole) of ethylurea were added to 50 ml. of toluene in a 200 ml. round-bottomed flask. Heating under reflux for about 20 hours in a slow stream of nitrogen resulted in the evolution of 93% of the theoretical amount of ethylamine, 1.64 grams. The resulting reaction mixture was separated by recrystallization from toluene to give 7.24 grams (60.5% yield) of 1,3-diethyl-2,4-diphenyl-6-keto-1,3,5,2,4-triazadiborinane. Chemical analysis of the product yielded the following data:

| Calculated for $C_{17}H_{21}B_2N_3O$ | Found in product |
|---|---|
| C=66.94%. | C=65.48%. |
| H=6.94%. | H=6.90%. |
| B=7.09%. | B=6.96%. |
| N=13.78%. | N=13.43%. |
| Mol. Wt.=305.01. | Mol. Wt.=298.6. |

*IV*

B-tri-p-tolyl-N-trimethylborazole, 7.38 grams (0.0188 mole) and 4.07 grams (0.0282 mole) of N-ethyl-N'-isobutylurea were mixed with 50 ml. of chlorobenzene in a 300 ml. round-bottomed flask. The reaction mixture was then heated under reflux for 24 hours. A slow stream of dry nitrogen carried 0.0254 mole of methylamine (0.79 gram, 90% of theory) into standard hydrogen chloride solution. The solvent was then removed by distillation at reduced pressure and the product was recrystallized from toluene to give 5.73 grams (54.2% yield) of 1-ethyl-3-methyl-5-isobutyl-2,4-di-p-tolyl-6-keto-1,3,5,2,4-triazadiborinane. Chemical analysis of the product yielded the following data:

| Calculated for $C_{22}H_{31}B_2N_3O$ | Found in product |
|---|---|
| C=70.43%. | C=68.80%. |
| H=8.33%. | H=7.96%. |
| B=5.77%. | B=5.63%. |
| N=11.20%. | N=10.81%. |
| Mol. Wt.=375.14. | Mol. Wt.=361.4. |

Other modes of applying the principle of the invention may be employed, change being made as regards the details described, provided the features as stated in any of the following claims or the equivalent of such be employed.

I, therefore, particularly point out and distinctly claim as my invention:

1. Ketotriazadiborinanes of the formula

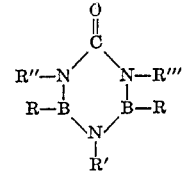

where R is selected from the group consisting of alkyl of from 1 to 5 carbon atoms, phenyl, m-substituted phenyl and p-substituted phenyl, said substituents selected from the group consisting of methyl, methoxy and chloro, R' is selected from the group consisting of hydrogen, alkyls of from 1 to 5 carbon atoms, phenyl, m-substituted phenyl and p-substituted phenyl, said substituents selected from the group consisting of methyl, methoxy and chloro and R'' and R''' are selected from the group consisting of alkyl of from 1 to 5 carbon atoms and hydrogen.

2. 1,2,4,5 - tetramethyl - 6 - keto - 1,3,5,2,4 - triazadiborinane.

3. 3 - phenyl - 2,4 - dimethyl - 6 - keto - 1,3,5,2,4 -triazadiborinane.

4. 1,3 - diethyl - 2,4 - diphenyl - 6 - keto - 1,3,5,2,4 -triazadiborinane.

5. 1 - ethyl - 3 - methyl - 5 - isobutyl - 2,4 - di - p - tolyl-6-keto-1,3,5,2,4-triazadiborinane.

6. The method for preparing ketotriazadiborinanes of the formula

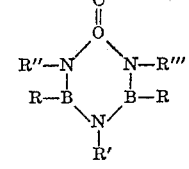

which comprises heating under reflux a urea of the formula

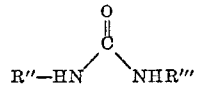

with a B-triorganoborazole, and recovering the desired ketotriazadiborinane from the resultant reaction mass, where R is selected from the group consisting of alkyl of from 1 to 5 carbon atoms, phenyl, m-substituted phenyl and p-substituted phenyl, said substituents selected from the group consisting of methyl, methoxy and chloro, R' is selected from the group consisting of hydrogen, alkyl of from 1 to 5 carbon atoms, phenyl, m-substituted phenyl and p-substituted phenyl, said substituents selected from the group consisting of methyl, methoxy and chloro and R'' and R''' are selected from the group consisting of alkyl of from 1 to 5 carbon atoms and hydrogen.

7. The method for preparing ketotriazadiborinanes of the formula

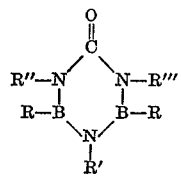

which comprises heating under reflux a urea of the formula

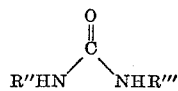

with a B-triorganoborazole, said reactants present in about a 3:2 molar ratio, respectively, and recovering the desired ketotriazadiborinane from the resultant reaction mass, where R is selected from the group consisting of alkyl of from 1 to 5 carbon atoms, phenyl, m-substituted phenyl and p-substituted phenyl, said substituents selected from the group consisting of methyl, methoxy and chloro, R' is selected from the group consisting of hydrogen, alkyl of from 1 to 5 carbon atoms, phenyl, m-substituted phenyl and p-substituted phenyl, said substituents selected from the group consisting of methyl, methoxy and chloro and R'' and R''' are selected from the group consisting of alkyl of from 1 to 5 carbon atoms and hydrogen.

No references cited.